United States Patent Office 3,226,524
Patented Dec. 28, 1965

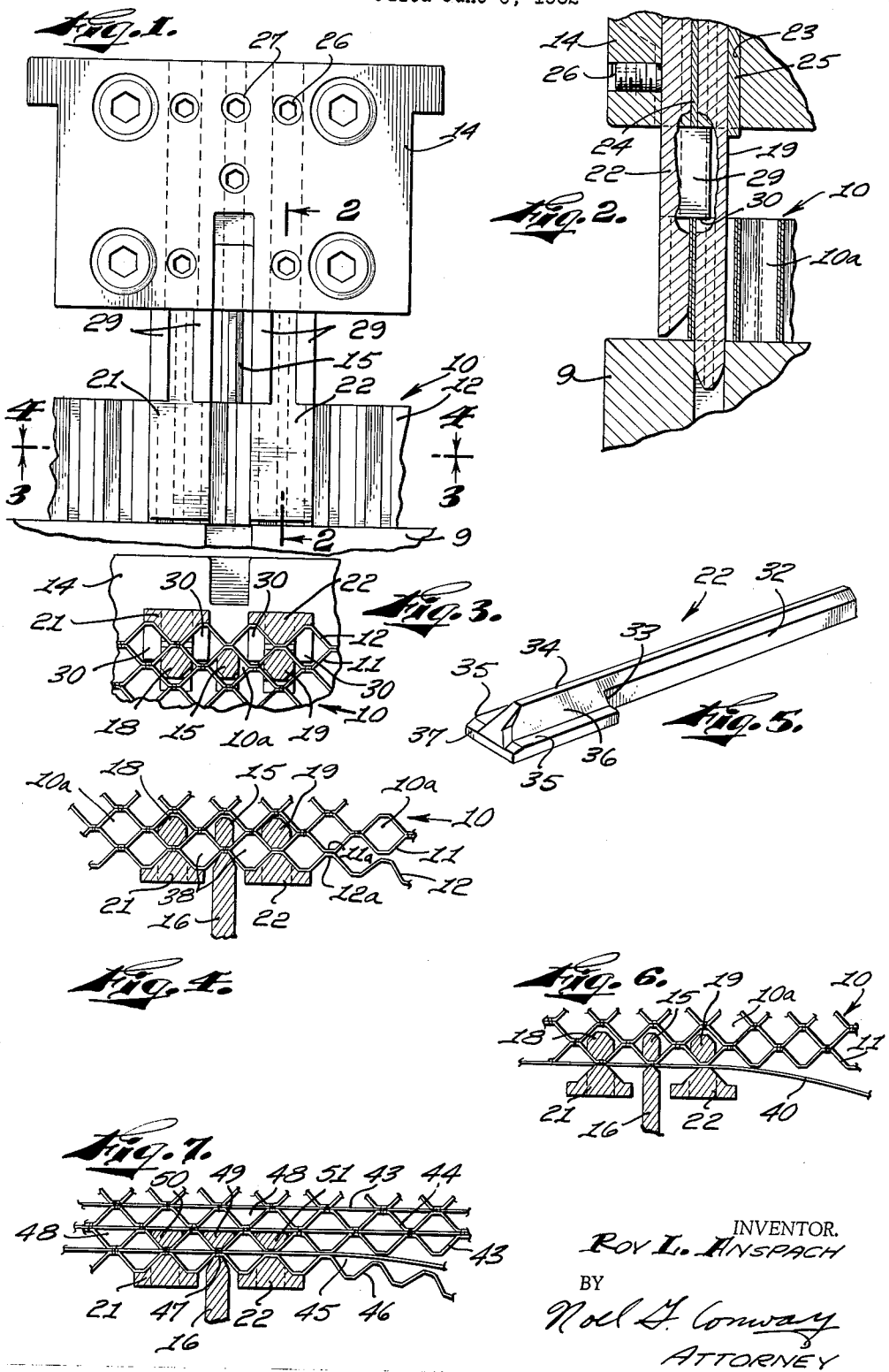

3,226,524
APPARATUS FOR FABRICATING HONEYCOMB
MATERIAL
Roy L. Anspach, Fullerton, Calif., assignor to Aeronca
Manufacturing Corporation
Filed June 8, 1962, Ser. No. 201,139
3 Claims. (Cl. 219—78)

This invention relates to apparatus for use in fabricating honeycomb material from strips, or ribbons, and more particularly to the means in such apparatus for properly indexing the strips, or ribbons, for the operation of joining the strips, or ribbons, together.

The present invention is especially useful in fabricating welded honeycomb core from pre-corrugated core strips, which honeycomb core then has attached to opposite faces thereof, surface sheets to form lightweight sandwich material. Such material is now mostly used in the construction of high performance aircraft.

In the past, difficulties have been encountered in maintaining proper quality control in honeycomb core. Particularly in welded honeycomb core, it is absolutely essential that the nodal areas be accurately aligned and firmly pressed together in order to obtain a good weld. The core material is very thin metal foil, e.g., 0.002 inch, and therefore, is quite susceptible to being burned out by arcing if the nodal areas are not firmly held together. Previously, it has been found necessary to insert, during the weld cycle, an index finger into the core cell on either side of the nodal areas to be welded. The difficulty arises in that, if the core strips are not accurately corrugated the cell on either side of the nodal area to be welded might be undersized. In such cases, the presence of such index fingers interferes with effecting the engagement between the nodal areas required for a reliable weld.

One important feature of my invention overcomes this disadvantage. I have developed a new index finger which cooperates with the core strips in such manner that there is no requirement for the use of index fingers in the core cell on either side of the nodal areas to be welded together. I have found that with the use of the new finger, not only is the quality of the resulting product improved, but the operating cost of the apparatus is reduced.

Accordingly, it is an object of this invention to provide apparatus for more efficiently fabricating honeycomb core.

Another object of this invention is to provide improved apparatus for fabricating core material for sandwich structures.

A further object of this invention is to provide apparatus for indexing core strips for the fabrication of honeycomb core.

A still further object of this invention is to provide, for fabrication of honeycomb core, apparatus which is more simple than prior apparatus of such nature.

Still another object of this invention is to provide an improved index finger for use in fabrication of honeycomb core.

It is a still further object of this invention to provide, for use in the fabrication of honeycomb core, versatile apparatus which can be quickly changed to accommodate different thicknesses of core strip and depth, or thickness of core material.

A still further object of this invention is to provide, for use in fabricating core material, apparatus which can align one section of pre-corrugated core strip with another core strip in the area at which the two strips are to be joined.

It is still another object of this invention to provide, for use in fabricating pre-corrugated core strips into honeycomb core material, apparatus which can accommodate variations in the core cell size.

Other and further objects of this invention will become apparent in the following detailed description of preferred embodiments of the present invention in conjunction with the attached drawings, wherein:

FIGURE 1 is a front view of apparatus embodying a preferred form of the present invention;

FIGURE 2 is an enlarged fragmentary cross-sectional view taken along line 2—2 in FIGURE 1;

FIGURE 3 is an enlarged fragmentary cross-sectional view taken along 3—3 in FIGURE 1;

FIGURE 4 is an enlarged fragmentary cross-sectional view taken along line 4—4 in FIGURE 1;

FIGURE 5 is a perspective view of a preferred embodiment of an index finger incorporating the present invention;

FIGURE 6 is a cross-sectional view illustrating the manner in which apparatus of the present invention can secure a flat core strip to previously fabricated core material; and, FIGURE 7 is a cross-sectional view illustrating a slightly different form of honeycomb core which can be fabricated with the use of apparatus incorporating the present invention.

Referring now to FIGURES 1 to 5, a first embodiment of the present invention will be described. The apparatus includes the bed plate 9 on which rests previously fabricated honeycomb core structure designated generally by the arrow 10. The previously fabricated core structure is made up of pre-corrugated core strips, or ribbons, 11 joined together at their respective nodal areas to form hexagonal cells 10a.

The general manner in which the honeycomb core structure is generated has been known in the past. More particularly, the core structure is produced by repeatedly indexing a new core strip juxtaposed the edge core strip of the previously fabricated core material and securing together alternate nodal areas of these two strips.

As best shown in FIGURE 4, a new core strip, or ribbon, 12 is fed by conventional means, not shown, so that its alternate nodal areas 12a are juxtarelated to the nodal areas 11a on the adjacent core strip 11. The core strips 11 and 12 have not been cross hatched in FIGURES 3 and 4 in order to make the drawings more clear.

In the present apparatus the actual welding is effected through the use of a welding electrode 15, carried by a vertically movable carrier block 14, and a separately movable wheel welding electrode 16. In order to sequentially locate the nodal areas in operable position relative to the electrode 15 and 16, means are carried by the lower portion of the core making machine for intermittently moving the core 10 and the new core strip 12 to the left a distance equal to the width of one core cell each move. The means for sequentially moving the core thusly, as well as the apparatus for supplying electricity to the electrodes 15 and 16 may be conventional and therefore are not shown.

The wheel electrode 16 is mounted on means (not shown) for movement independent of the carrier block 14. And, as in the past, the weld is effected by first inserting the finger electrode 15 into the desired core cell after which the wheel electrode 16 is moved along the nodal area juxtaposed the nodal area engaged by the finger.

The previously mentioned intermittent movement means is satisfactory to generally index the previously fabricated core structure 10 and new core strip 12 adjacent each other. However, further structure is required to index the nodal areas with the accuracy needed for quality walls. Accordingly the carrier block 14 carries a series of index fingers in addition to the welding electrode 15. And means (not shown) to move the carrier block 14 vertically between a lower position where the index fingers and the welding electrode 15 are inserted into various cores cells in engagement with core structure and an upper position where the index fingers and welding electrode are above the core structures. When the carrier block 14 is at the last mentioned position, the core structure may be advanced or moved preparatory for the next welding operation. The means which move the carrier block 14 up and down may be conventional and therefore are not shown.

The carrier block 14 carries a left internal index finger 18 and a right internal index finger 19 depending from said block on respective sides of the welding electrode 15. The electrode 15 and the index fingers 18 and 19 have cross-sections somewhat smaller than the average cell cross-section in order to accommodate the aforementioned undersized cells which normally occur.

The carrier block 14 also carries left and right external index fingers 21 and 22 respectively. These index fingers, as well as index fingers 18 and 19, extend up through holes 23 in the block 14 and are spaced relatively to the block as desired by means of shims 24 and 25. Set screws 26 anchor the fingers in the holes 23. As best seen in FIGURE 2, the shim 24 operates to space the internal index finger 19 apart from the external index finger 22, a distance equal to two thicknesses of core strip material. This permits the index fingers to be inserted on both sides of the nodal areas as desired. The shim 25 is used to fill the remaining portion of the hole 23. With this arrangement, the same carrier block 14 can accommodate a wide variety of sizes of index fingers and welding electrodes which can in turn accommodate a corresponding wide variety of honeycomb core structures.

Set screws 27 hold the electrode 15 in the carrier block 14 similarly to the set screw 26.

As mentioned above and will be developed, the index fingers operate to accurately position together the nodal areas which are to be welded. It is also necessary that the respective core strips 11 and 12 be aligned vertically, or longitudinally of the axis of the core cells. To this end, a pair of alignment blocks 29 depend from the carrier block 14 on the left and right sides each of the holes 23 respectively. In the preferred embodiment the alignment blocks 29 are integral with the carrier block 14.

The alignment blocks 29 have rather small lower faces 30 which engage the upper edge of the core strips 11 and 12 forcing the said core strip against the bed plate 9. It should be noted that in the present apparatus the alignment blocks 29 vertically align the core strips only in the area immediately adjacent the respective index fingers. That is, each pair of the faces 30 only engage the upper edge of the core strips 11 and 12 and engage the upper edges of these core strips only in the area of a respective pair of abutting nodal areas located between the index fingers at that time.

Prior to the present invention a relatively wide, flat plate was used to align vertically the core strips. With such apparatus a difficulty arose when the machine inadvertently failed to properly align two adjacent core strips for the welding operation. As a result of the misalignment one of the core strips projects too high above the bed plate and is engaged by the flat plate thus interfering with subsequent alignment operations.

As can be seen, with apparatus of the present invention, the edge of the core strips are engaged for alignment only at the critical locations. Therefore, if one core strip becomes inadvertently misaligned at one portion thereof, it will not interfere with the alignment procedure at the time of subsequent welds.

A perspective view of a preferred form of my new index finger, designated as 22, is shown in FIGURE 5. The finger 22 comprises an upper end 32 and a pair of upwardly facing faces 33. The faces engage the lower faces 30 of the alignment blocks 29 when the finger 22 is inserted in the carrier block 14.

At the lower part of the finger 22 is an operating face comprising a central node-engaging surface extending axially along the finger 22. The central node-engaging surface 34 is flanked on either side by side nodal engaging surfaces 35, which node-engaging surfaces are joined by cell wall engaging surfaces 36. The finger 22 is rounded off at its lower end at 37 in order that it may be inserted over the core strip more easily. See FIGURE 2 also.

With the preferred configuration, the operating face of the finger 22 engages three adjacent nodal areas of the core strip when the carrier block 14 is in its lower position. I have found that with an index finger that can do this, I may dispense with the use of an index finger for each cell 38 on each side of the nodal areas being welded. Preferably, the surfaces 36 parallel and engage the cell walls between the three adjacent nodal areas engaged by the particular index finger. However, when manufacturing with core strips of extraordinary rigidity, this is not a stringent requirement.

FIGURE 6 discloses an additional advantage of the present apparatus. More specifically, the present apparatus can be used to apply a flat foil edge strip 40 to the previously fabricated core structure without modification. This is because the present apparatus does not require an index finger for the cells on either side of the nodal areas being welded together.

The welding procedure is the same as described above and therefore, will not be repeated again here.

FIGURE 7 discloses a slightly different form of honeycomb core structure which may be produced with apparatus according to the present invention. The core structure shown consists of alternating corrugated core strip 44 and flat core strips 45 which are welded together at the respective juxtarelated nodal areas to constitute a plurality of trapezoidal core cells 48.

Since the core cells 48 are trapezoidal, it is necessary that welding electrode 49 which is inserted into the completed core cell also be trapezoidal. The same is true of left and right internal index fingers 50 and 51 respectively. It should be noted that, as in the case of index fingers 18 and 19, the index fingers 50 and 51 may be sufficiently smaller than the average size of the core cell 48 that they may be freely inserted into any undersized core cells which normally occur. Since the left and right external index fingers 21 and 22 as well as the electrode 16 can accommodate either corrugated core strip or flat core strip, they may be used without modification in producing the honeycomb core structure disclosed in FIGURE 7.

The process of producing the honeycomb core structure shown in FIGURE 7 is only slightly different than that previously described. The primary difference comes from fact that a flat core strip 45 and a corrugated core strip 46 are both simultaneously fed and welded to the previously fabricated core structure. Accordingly, the weld which is made at the nodal areas at 47 joins three thicknesses of core foil rather than only two.

Where only a few embodiments of my invention have been illustrated and described in detail, it will be apparent to those skilled in the art that such is by way of illustration only, and numerous changes can be made to the apparatus shown, without departing from the spirit of the present invention. Accordingly, the protection afforded by this patent should be limited solely by the appended claims.

I claim:
1. In a honeycomb core fabricating machine, the combination of:
    a horizontal bed plate for supporting a previously fabricated core section with the nodal areas of its cells at one edge thereof juxtaposed to the nodal areas of a pre-corrugated core strip to be welded thereto;

a carrier block disposed above said bed plate for vertical movement relative to said bed plate;

a first welding electrode carried by said block adapted to be inserted into one of said cells and engage the nodal area thereof juxtaposed to said core strip;

a second welding electrode disposed on said machine to traverse the core strip nodal area juxtaposed to the nodal area engaged by said first mentioned electrode;

first and second internal index fingers carried by said block and disposed to be inserted into cells disposed on the left and right hand sides of said one cell respectively, said first and second internal index fingers engaging nodal areas of said previously fabricated core section, the nodal areas engaged by said first and second index fingers and the nodal area engaged by said first electrode being substantially coplanar;

third and fourth index fingers carried by said block disposed to urge two of said core strip nodal areas into abutting relation with the aforementioned engaged nodal areas of said left and right cells respectively when said first mentioned electrode is inserted in said one cell, said third and fourth index fingers being shaped complementary with said core strip so that when said first electrode is inserted in said one cell they respectively engage the three core strip nodal areas immediately to the left and the three core strip nodal areas immediately to the right side of the nodal area traversed by said second electrode, whereby the cells immediately adjacent said electrodes are not engaged by internal fingers.

2. Means for indexing a pair of honeycomb core strips having a series of nodal areas joined by connecting portions, said means comprising:

a carrier block;

a first elongated index finger secured to said block, said finger being formed with an operating face adapted to engage simultaneously three adjacent nodal surfaces of one of said core strips;

a second elongated index finger secured to said block parallel to said first finger, but spaced therefrom a distance equal to the combined thickness of said pair of core strips;

a pair of alignment blocks carried by said carrier block on opposite sides of said fingers, said alignment blocks adapted to engage the edge of each of said core strips only in the area immediately adjacent the said fingers, said alignment blocks being fixedly secured to said carrier block, whereby the alignment blocks move with the carrier block and index fingers.

3. In a honeycomb core welding machine of the type comprising a pair of cooperating electrodes adapted to engage opposite juxtaposed nodal areas of pre-corrugated ribbons, the improvement which comprises a welding index finger for indexing a pre-corrugated ribbon in forming honeycomb core material, said finger being elongated with a vertical axis;

the upper end of said finger being adapted to be secured to a carrier block for moving the finger to operative position;

the lower end of said finger being formed with an operating face adapted to engage simultaneously three adjacent nodal surfaces of said ribbon, said face having a first node-engaging area extending parallel to said longitudinal axis, said face having second and third node-engaging areas displaced on opposite sides of said first node-engaging area, said three node-engaging areas being disposed relative to each other so as to be capable of being engaged simultaneously with three adjacent nodal areas of said pre-corrugated ribbon, said first node-engaging area being substantially coplanar with the nodal area engaged by one said electrodes and projecting forward of said second and third node-engaging areas so as to present a protruding rib on said operating face, whereby said first node engaging area can also be employed selectively to weld a flat ribbon to a pre-corrugated ribbon.

References Cited by the Examiner

UNITED STATES PATENTS

| | | |
|---|---|---|
| 2,927,991 | 3/1960 | Schoelz. |
| 2,968,712 | 1/1961 | Runkle. |
| 3,028,481 | 4/1962 | Covert. |
| 3,051,824 | 8/1962 | Wilson. |
| 3,064,116 | 11/1962 | Thomas et al. |
| 3,079,487 | 2/1963 | Rohr. |

RICHARD M. WOOD, *Primary Examiner.*